(12) United States Patent
Colvin et al.

(10) Patent No.: US 6,991,585 B2
(45) Date of Patent: Jan. 31, 2006

(54) TORSIONAL ISOLATION OF A CONVERTLESS AUTOMATIC TRANSMISSION THROUGH SLIP CONTROL OF FRICTION CLUTCH

(75) Inventors: Dan Colvin, Farmington Hills, MI (US); Marvin Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 10/838,489

(22) Filed: May 4, 2004

(65) Prior Publication Data
US 2005/0250618 A1  Nov. 10, 2005

(51) Int. Cl.
*B60K 41/02* (2006.01)
*G06F 17/00* (2006.01)

(52) U.S. Cl. ........................ 477/174; 477/176; 701/67
(58) Field of Classification Search ................ 477/174, 477/176, 179, 180; 701/67, 68
See application file for complete search history.

(56) References Cited

U.S. PATENT DOCUMENTS

| 4,747,886 | A | * | 5/1988 | Dankovic et al. ........... 148/196 |
| 4,757,886 | A | * | 7/1988 | Brown et al. ................ 192/3.3 |
| 5,020,391 | A | * | 6/1991 | Aoki et al. .................. 477/143 |
| 5,400,678 | A | * | 3/1995 | Jain et al. .................... 477/115 |
| 5,531,302 | A | * | 7/1996 | Koenig et al. ............... 192/3.3 |
| 6,021,880 | A |   | 2/2000 | Reed, Jr. et al. |
| 6,176,808 | B1 |  | 1/2001 | Brown et al. |
| 6,213,270 | B1 |  | 4/2001 | Jäckel et al. |
| 6,217,481 | B1 |  | 4/2001 | Watanabe et al. |
| 6,253,140 | B1 | * | 6/2001 | Jain et al. ..................... 701/67 |
| 6,299,565 | B1 |  | 10/2001 | Jain et al. |
| 6,887,184 | B2 | * | 5/2005 | Buchanan et al. .......... 477/174 |
| 6,909,955 | B2 | * | 6/2005 | Vukovich et al. ............. 701/51 |

* cited by examiner

*Primary Examiner*—Tisha Lewis
(74) *Attorney, Agent, or Firm*—David B. Kelley; MacMillan, Sobanski & Todd

(57) ABSTRACT

An automotive vehicle driveline includes an internal combustion engine for transmitting input torque to a hydraulically-actuated input clutch, and having a throttle controlled by a displaceable accelerator pedal. A transmission produces multiple gear ratios between the clutch and an output. A method for controlling operation of the clutch includes determining a magnitude of clutch pressure that would produce a torque capacity of the input clutch equal to the current magnitude of input torque; if no transient condition occurs, pressurizing the clutch at a magnitude of pressure that produces a predetermined slip of the input clutch at the current magnitude of input torque; and if a transient condition occurs, holding and/or reducing the determined input clutch pressure such that slip occurs at the input clutch.

18 Claims, 11 Drawing Sheets

| Gear | 40 RC | 28 FC | 20 DC | 38 LR | 41 2/4 Band |
|---|---|---|---|---|---|
| 1st |  | X |  | X |  |
| 2nd |  | X |  |  | X |
| 3rd |  | X | X |  |  |
| 4th |  |  | X |  | X |
| REV | X |  |  | X |  |

TORSIONAL ISOLATION OF A CONVERTLESS AUTOMATIC TRANSMISSION THROUGH SLIP CONTROL OF FRICTION CLUTCH

BACKGROUND OF THE INVENTION

The invention relates to the field of automatic transmission control, particularly to a control of a forward drive clutch or a reverse drive clutch in a vehicle driveline that does not include a hydrokinetic torque converter.

In conventional multiple-speed transmissions, a hydrokinetic torque converter is located in the driveline between the crankshaft of an internal combustion engine and multiple speed gearing, which establishes torque flow paths to the vehicle traction wheels. Attempts have been made to eliminate the torque converter from the driveline in order to eliminate its low hydrokinetic efficiency. Eliminating the torque converter also reduces the rotary mass of the torque transfer elements at the input side of the gearing.

The driveline of a conventional motor vehicle is a very lightly damped second order mechanical system having of two elements—inertia and torsional stiffness. Transient disturbances to this system, such as those that result by rapidly depressing the accelerator pedal (a "tip-in") or suddenly releasing the pedal (a "tip-out"), can cause vibratory oscillations of the system.

The gears, splines and chain drives in an automatic transmission always have some lash, the clearance between connected mechanical components. The effect of lash is most apparent in a driveline when the net torque passes through zero between positive and negative torque, such as when a tip-in or tip-out occurs. During a tip-in, an increase in input torque accelerates the system inertia. Normally the driveline stiffness helps to resist acceleration of the inertia. When clearance or lash is present, however, system inertia is able to accelerate freely until lash is taken up by displacement of driveline components. When lash is taken up, the extra energy stored in the system inertia is suddenly placed on the driveline, creating an impulse. This impulse of energy released into the driveline causes an oscillation in the system. Under these conditions, there is very little damping capacity in the driveline to attenuate vibrations.

In a conventional automatic transmission, the torque converter provides a passive hydraulic coupling between the driveline and the engine, which helps to reduce transient vibrations. Even with a torque converter, a tip-in or tip-out is a major concern when the input torque reverses direction from a positive torque condition to a negative torque condition. For a tip-out, many manufacturers force the engine to continue producing positive torque by actively controlling an idle air bypass system so that the input torque does not reach zero.

In a pre-transmission hybrid powertrain, such as that described in U.S. Pat. No. 6,176,808, driveline transient torque impulses are difficult to attenuate because there is no torque converter in the driveline to provide a source of damping, and a hybrid vehicle uses brake regeneration to recover much of the braking energy from the vehicle. Brake regeneration imposes a negative torque on the driveline, which the transmission must transfer whenever the accelerator pedal is off. Because the transmission must transfer negative torque, idle air bypass control is not available to maintain positive driveline torque.

U.S. Pat. No. 6,299,565 describes a solution to this problem for a powershift transmission. Slip control of the input clutch was accomplished along with control of the input through filtering of the engine throttle. This solution required Electronic Throttle Control (ETC) to slow the change in input similar to using idle air bypass control for a tip-out.

There is need for slip control of the input clutch to deal with torsional impulses in a driveline whose engine has a mechanical throttle, without using ETC to manipulate idle air.

SUMMARY OF THE INVENTION

The torsional isolation controller according to this invention operates continuously. To control torsional transients, one of the transmission input clutches, a hydraulically actuated friction clutch or brake, is allowed to slip. Under steady state operating conditions, the hydraulic pressure in the input clutch is controlled by a closed loop controller to produce a small magnitude of slip across the clutch. During transient events, pressure in the clutch is controlled by open loop control to hold the clutch without slip, and with a small amount of excess torque capacity beyond what is necessary to carry the current input torque. This condition is sometimes referred to as incipient slip.

The pressure for the input clutch is continuously calculated as a function of the transmission input torque. When the input torque changes due a tip-out of the accelerator pedal, an open loop feed forward pressure causes the clutch pressure to follow. At very low input torque levels, the clutch pressure is held just above clutch stroke pressure because slip control is not possible when the input torque magnitude is low. During a tip-in maneuver, the input torque calculation is temporarily discontinued, and the clutch pressure is lowered to force the clutch to slip in order to mitigate the driveline transient. Once the clutch slip increases to a predetermined magnitude, the torque calculation is resumed.

One of the tasks of this controller is to select the appropriate clutch to control among the several transmission input clutches. Whenever two input clutches are active elements, as in third gear in the transmission described here, the clutch that is not controlling the transient is controlled to a pressure that is just above incipient slip. Since the clutches used to control these driveline transients are also used in transmission shifting and launch, the control is coordinated with the shift/launch controller. The output of the linear solenoids that control the pressure varies with the input pressure. For this reason, coordination with the line pressure control also exists.

An advantage of this invention is its ability to smoothly handle the effect of lash in the drive components, particularly in the gears and chain, due to a tip-in from a heavy negative torque (from brake regeneration) to a positive torque. Upon the occurrence of a tip-in, the control remains in soft lock and the torque calculation is held until a preset level of slip occurs. When a preset level of slip occurs, the controller updates the torque calculation and may change to hard lock mode. The desired pressure from the controller increases, but the actual commanded pressure increase is limited by a rate limiter.

The control strategy of the present invention can be applied to a transmission that does not use a torque converter or in a transmission for which the torque converter bypass clutch is always engaged, even in first gear. This control could be implemented on an automatic transmission through control of the torque converter bypass clutch, such that the bypass clutch is fully engaged at much lower vehicle speeds than are currently possible.

The method of this invention can be applied to an automotive vehicle driveline that includes an internal combustion engine for transmitting input torque to a hydraulically-actuated input clutch and having a throttle that is controlled by a displaceable accelerator pedal. A transmission produces multiple gear ratios between the input clutch and an output. The clutch is hydraulically-actuated and has a variable torque capacity, slip and clutch pressure. The method for controlling operation of the clutch includes determining the current magnitude of input torque transmitted to the clutch by the engine; monitoring slip speed at the input clutch; determining a magnitude of clutch pressure that would produce a torque capacity of the input clutch equal to the current magnitude of input torque; monitoring the position of the accelerator pedal to determine whether a transient condition occurs; if no transient condition occurs, pressurizing the clutch at a magnitude of pressure that produces a predetermined slip of the input clutch at the current magnitude of input torque; and if a transient condition occurs, reducing said determined magnitude of input clutch pressure to by a predetermined magnitude such that slip occurs at the input clutch.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
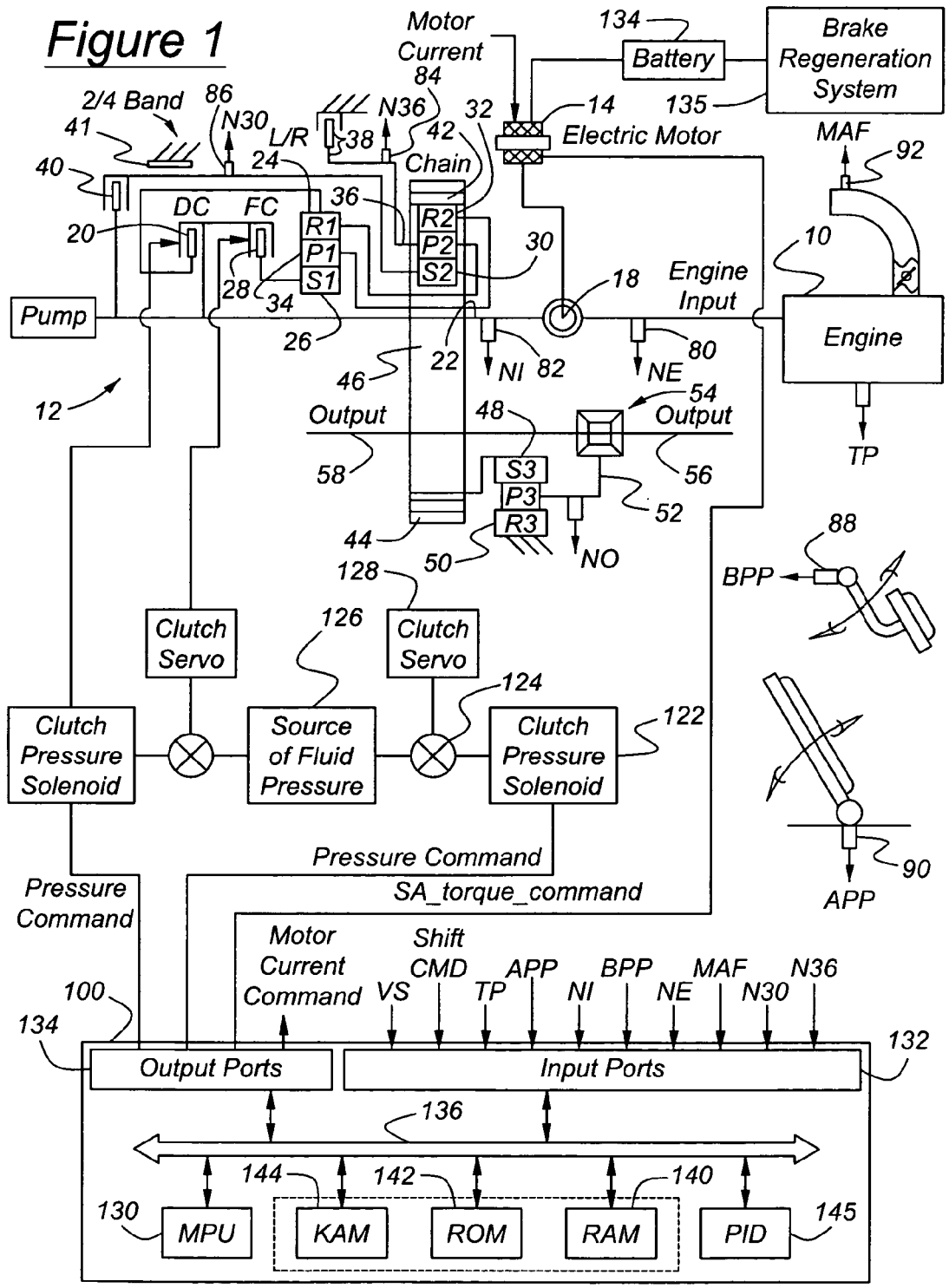
FIG. 1 is a schematic diagram of a system for controlling the driveline for a hybrid vehicle.
Figure 2:
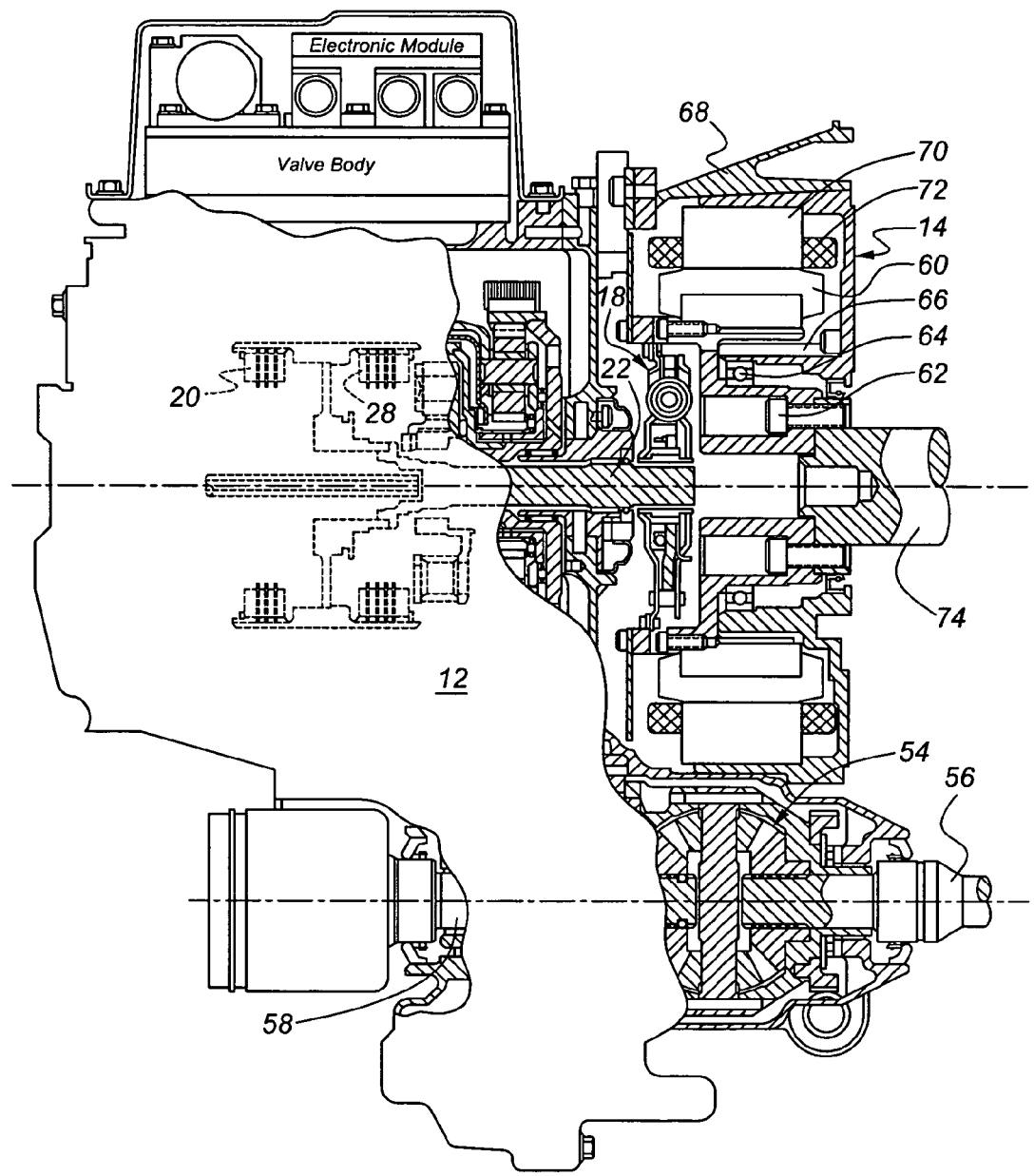
FIG. 2 is a partial cross sectional view of a transmission for an automotive vehicle driveline, whose engine crankshaft is connected to the transmission input by a torsion damper rather than a torque converter.

Referring now to the drawings, there is illustrated in FIGS. 1 and 2 a hybrid vehicle driveline to which the present invention may be applied. The driveline includes an internal combustion engine 10, a multiple-speed vehicle transmission 12, an induction motor 14 located between the engine 10 and transmission 12, and a torsion damper 18. The rotor of the induction motor is connected directly to the transmission input 22, and the engine is also driveably connected to the input.

A direct clutch (DC) 20 alternately connects and disconnects the transmission input shaft 22 to the ring gear 24 of a first simple planetary gear unit. Sun gear 26 of the simple planetary gear unit is connected through a forward clutch (FC) 28 to the input 22. Ring gear 24 is connected to sun gear 30 of a second planetary gear unit. The ring gear 32 of the second planetary gear unit is connected to the planetary carrier 34 of the first planetary gear unit. Transmission input 22 is connected through reverse clutch (RC) 40 to the sun gear 30.

The planetary carrier 36 of the second planetary gear unit is alternately held against rotation and released to rotate freely by low-and-reverse brake (L/R) 38. During reverse drive operation, brake 38 anchors planetary carrier 36. A 2/4 brake 41 alternately holds sun gear 30 and an element of clutch 40 against rotation and releases them to rotate independently.

Figures 3, 4:
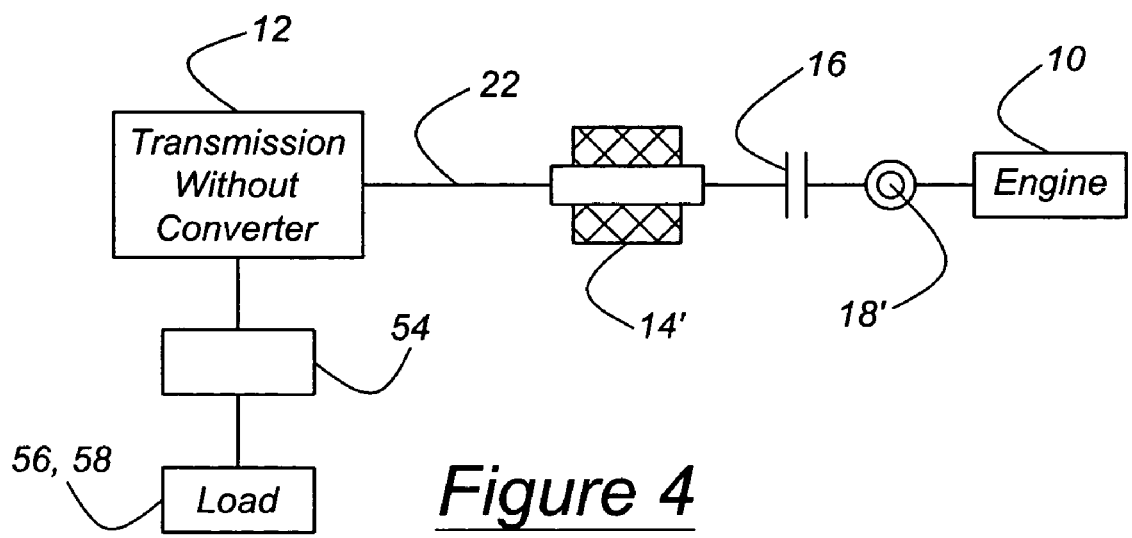
FIG. 3 is a chart showing the state of clutch and brake engagement and disengagement for each of the forward drive and reverse drive gears of the transmission of FIG. 1.
FIG. 4 is a schematic block diagram showing the drive connections among the engine, damper, motor, transmission, and the load or traction wheels.

FIG. 3 shows the states of engagement and disengagement of the clutches and brakes shown in FIG. 1 for each of the forward and reverse gears of the transmission. The clutches and brakes are engaged and released selectively to establish each of four forward-drive ratios and one reverse drive ratio. The symbols RC, FC, DC, L/R and 2/4, shown in FIG. 3, designate the clutches and brakes that are similarly designated in FIG. 1.

First gear is produced by engaging the forward clutch 28 and the low-and-reverse brake 38. The second forward drive ratio is achieved by engaging the forward clutch 28 and brake 41. The third forward ratio, a direct drive ratio, is produced by engaging the forward clutch 28 and the direct clutch 20, The fourth forward ratio, an overdrive ratio, is produced by engaging direct clutch 20 and brake 41. Reverse clutch 40 and low-and-reverse brake 38 are engaged during reverse drive operation.

The ring gear 32 acts as a torque output element for the gearing. It defines a driving sprocket 42, which drives a driven sprocket 44 by means of a drive chain 46. The driven sprocket drives the sun gear 48 of the final drive gear unit. The ring gear 50 of the final drive gear unit is anchored, and the planetary carrier 52 transmits torque output to differential gear unit 54, which transmits torque to each of two axle half shafts 56 and 58.

FIG. 2 is a cross sectional view showing the electric induction motor 14 and its relationship to the automatic transmission 12 and engine 10. The induction motor includes rotor 60, which is connected directly by crankshaft bolts 62 to a flange on the engine output shaft. The rotor 60 is journalled by bearing 64 to a bearing support 66, which forms a part of the transmission housing 68. Surrounding the rotor 60 is the motor stator 70, which includes stator windings 72. The torque output side of the rotor 60 includes a conventional damper 18. The torque output hub of the damper 18 is splined to torque input shaft 22 of the transmission 12.

FIG. 4 is a schematic block diagram showing an alternate hybrid driveline for an automotive vehicle. A friction clutch 16 alternately connects and disconnects the engine 10 and the transmission input 22 as the clutch is engaged and disengaged. An electric motor 14' is continually driveably connected to input 22, and a torsion damper 18 may be in the driveline between the engine 10 and clutch 16. The load, represented by output half shafts 56, 58, which drive the traction wheels, is connected to the planetary gear unit 32 through differential gear unit 54.

Speed sensors 80, 82, 84, 86 produce electronic signals representing the rotating speed of the engine crankshaft 74 (NE), transmission input shaft 22 (NI), carrier 36 (N36), and sun gear 30 (N30), respectively. A brake pedal position sensor 88 produces a signal (BPP) representing the displacement of the brake pedal. A accelerator pedal position position sensor 90 produces a signal (APP) representing the displacement of the accelerator pedal, which signal is a measure of the displacement of the engine throttle, by which the torque output of the engine 10 is controlled. A mass air flow sensor 92 produces a signal (MAF) representing the mass flow rate of air into the engine. These signal are used in the control strategy, which is described below.

The control strategy of this invention can be applied to a powertrain of FIGS. 1 and 2 and is described with reference to the forward clutch 28 being controlling according to this invention. Alternatively, the control strategy of this invention can be applied to the direct clutch 20. Preferably forward drive vehicle launch is controlled through operation of the forward clutch 28, and reverse drive vehicle launch is controlled through operation of the low-and-reverse brake 38.

A controller 100 receives signals generated by sensors, processes, and uses the input signals to determine the magnitude of pressure to be applied to clutch 28 in accordance with a clutch control strategy. Based upon this determination, the controller generates a command signal that causes the torque capacity of clutch 28 to change, whereby the clutch slips, fully engages or fully disengages. The magnitude of clutch pressure establishes the magnitude of torque transmitted by the clutch 28.

In the preferred embodiment, the controller 100 is a powertrain controller that includes one or more digital microprocessors or digital computers, which cooperatively perform calculations, and execute subroutines and control algorithms. Controller 100 preferably generates either a pulse width modulated (PWM) command output signal or a variable output signal, which controls the amount of slippage between the friction discs and spacer plates of clutch 28, thereby controlling the relative magnitudes of torque and power transmitted through the transmission between the transmission input 2 and the driven axles 54, 56. In the case where the output is a PWM signal, its duty cycle is the percentage of the cycle time for which the signal is activated or enabled. The variable output is a current signal applied to a solenoid. The output signal of the controller is communicated to a solenoid 122, which operates a hydraulic valve 124 that opens and closes a source of fluid pressure 126 to the servo 128 of clutch 28.

Controller 100 is preferably a microprocessor-based controller, which provides integrated control of engine 10 and transmission 12. The present invention may be implemented with a separate engine or transmission controller depending upon the particular application. Controller 100 includes a microprocessor 130 (MPU) in communication with input ports 132, output ports 134, and computer readable media via a data/control bus 136. Computer readable media may include various types of volatile and nonvolatile memory such as random access memory (RAM) 140, read-only memory (ROM) 142, and keep-alive memory (KAM) 144. These functional descriptions of the various types of volatile and nonvolatile storage may be implemented by any of a number of known physical devices including, but are not limited to EPROMs, EEPROMs, PROMS, flash memory, and the like. Computer readable media include stored data representing instructions or algorithms executable by microprocessor 130 to implement the method according to the present invention for controlling the hydraulic pressure and torque transmitting capacity of clutch 28.

Figure 5A:
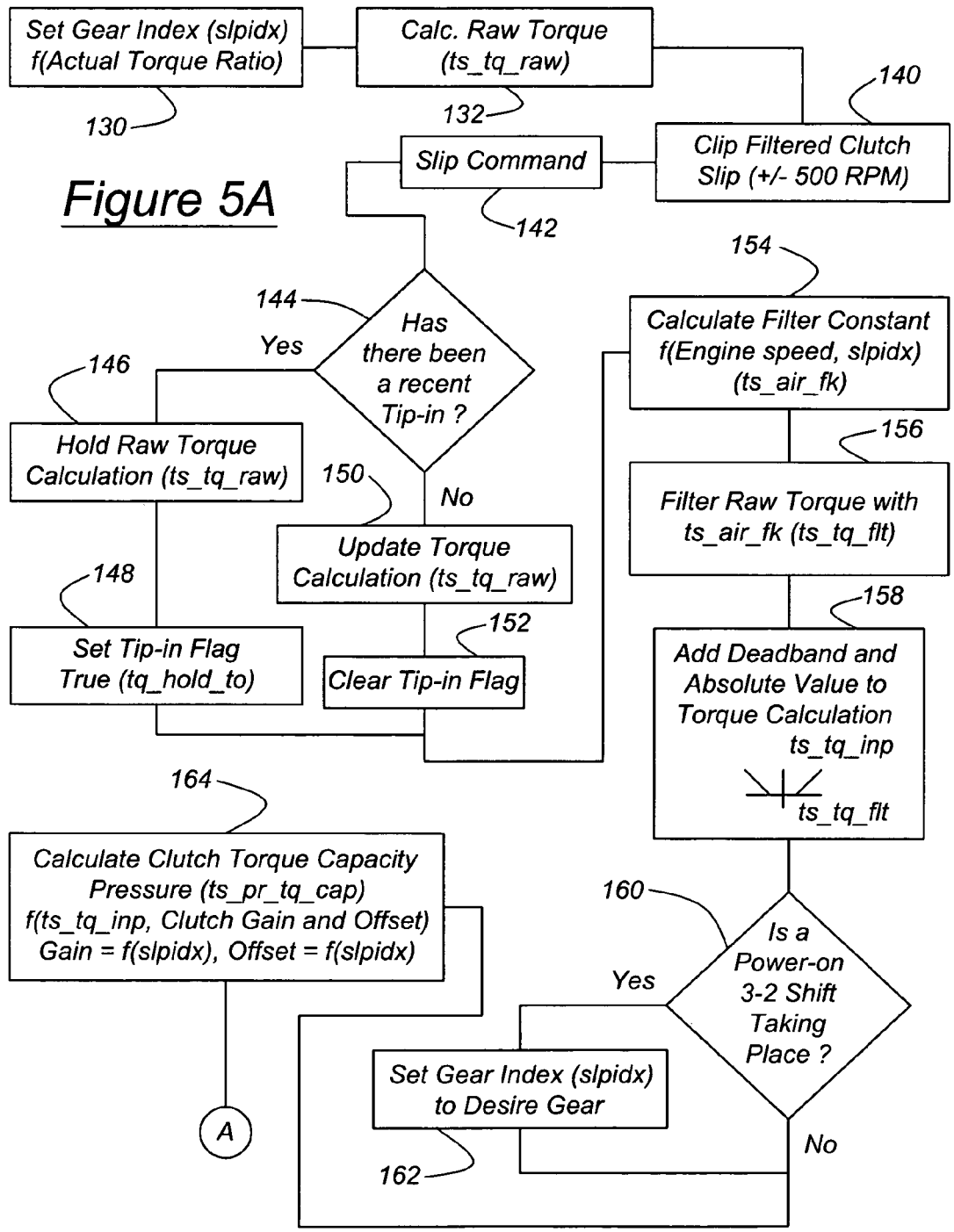
FIGS. 5A–5C are a logic diagram for a continuous torsional isolation controller.
Figure 5B:
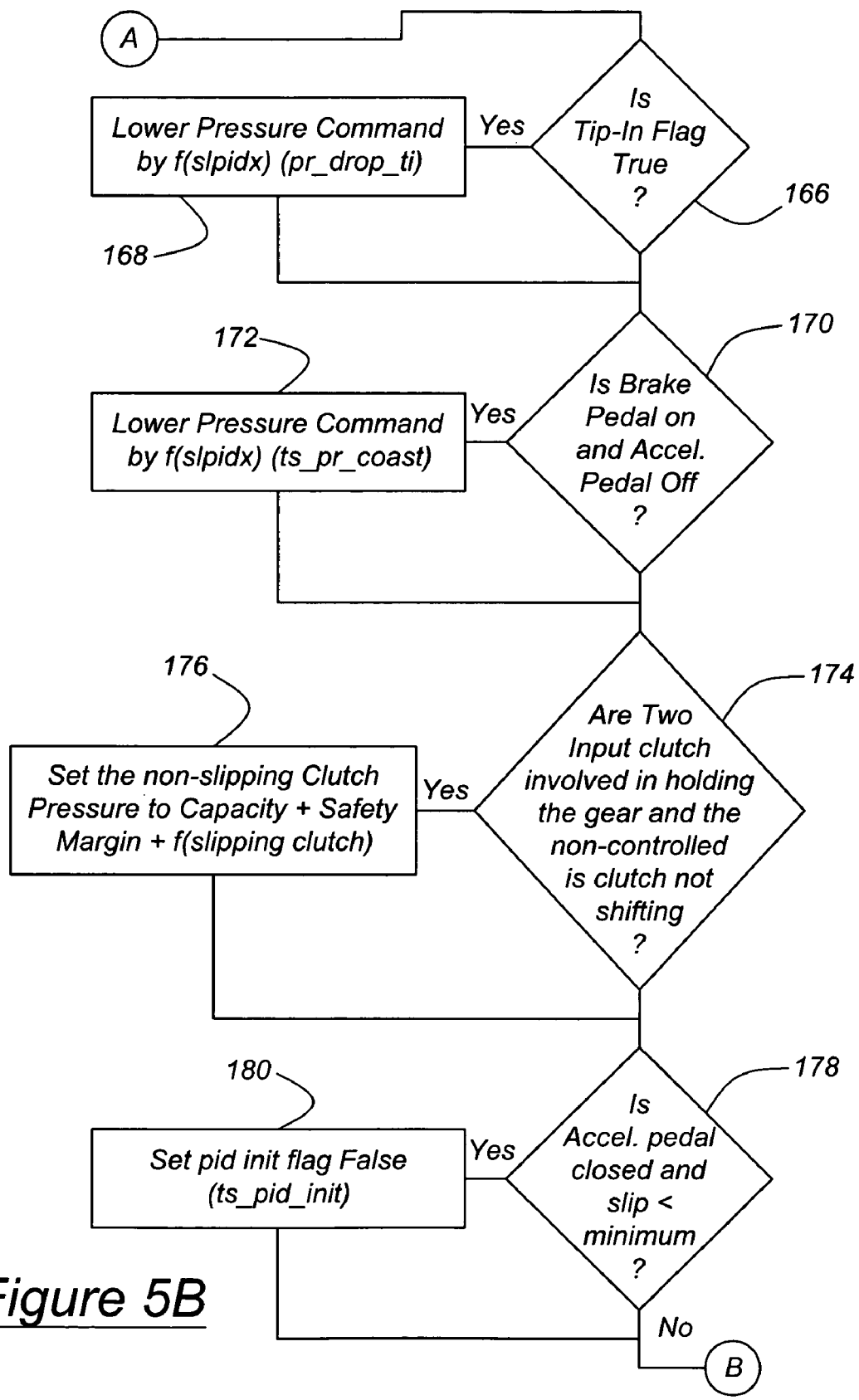
Figure 5C:
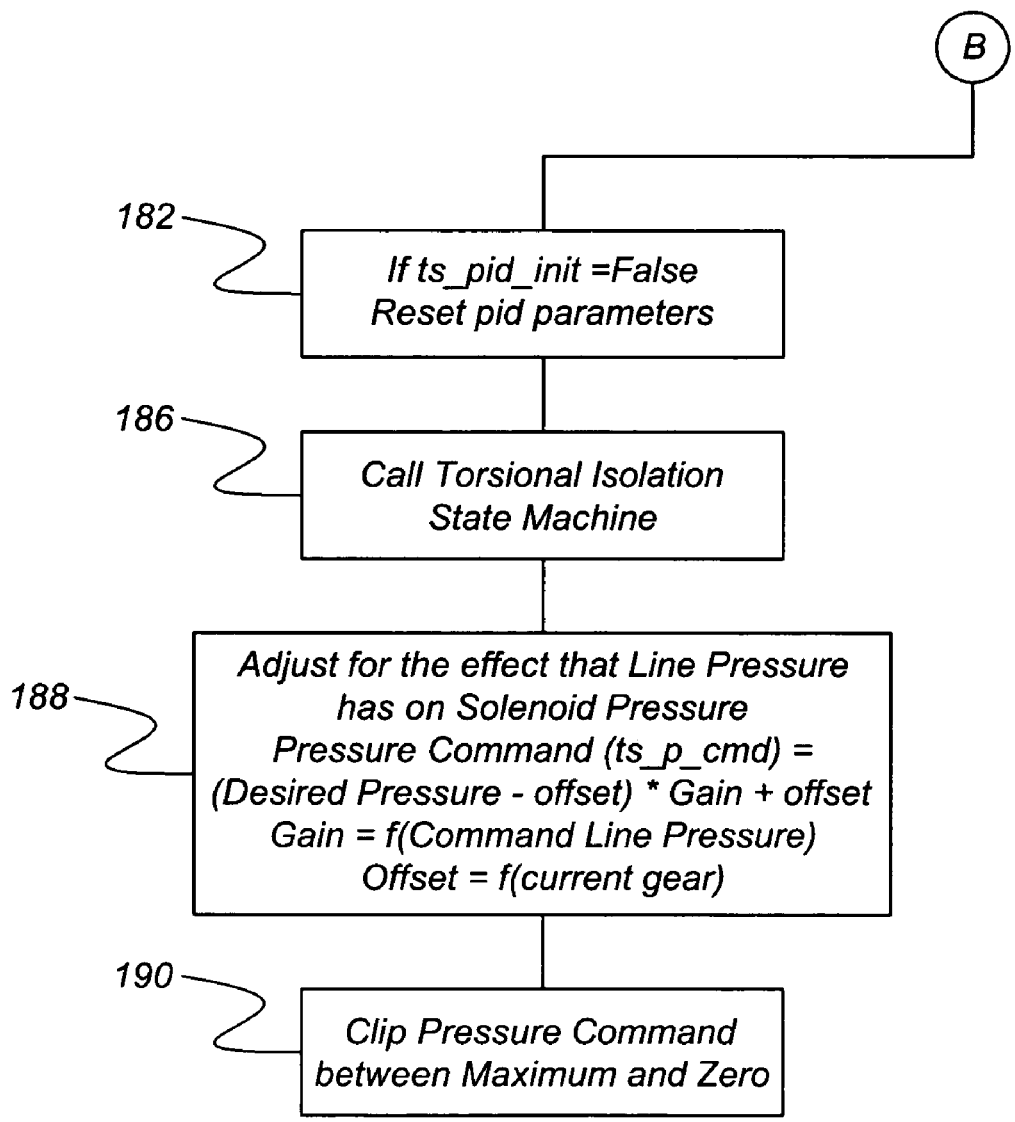

FIGS. 5A–5C illustrate, in the form of a logic flow diagram of the torsional isolation method, steps executed repetitively at frequent intervals by the controller 100. At step 130 the torsional isolation controller sets the gear index. From this index, the actual controlling friction element is determined. When the transmission is operating in a current gear, the gear index is the gear that corresponds to the current operating gear ratio. During a gearshift, the gear index is the gear that corresponds to the current torque ratio produced by the transmission. During an upshift, the torque ratio changes at the beginning of the shift; therefore, the gear index will point to the upshifted gear during a gear ratio change.

At step 132 the torque produced by the engine is determined from a look-up table stored in electronic memory indexed by the mass air flow MAF and engine speed NE. Motor torque is determined from the magnitude of electric current supplied by a battery 134 to the stator winding of the motor 14. The battery 134 is charged by a source 135 of brake regeneration energy recovered from the vehicle inertia through operation of the wheel brakes. The engine torque and motor torque magnitudes are summed to produce the magnitude of torque transmitted to the transmission input 22.

Slip across clutch 28 is calculated from the measured speeds of the components that are driveably connected by the clutch. Calculated clutch slip is then filtered at +/−500 rpm to provide control resolution at 140.

A clutch slip command is produced at 142 approximately every 16 Msec from values of a look-up table indexed by accelerator pedal position APP and vehicle speed VS for the current gear index.

The controller 100 determines at 144 if a tip-in has recently occurred. If a recent tip-in has occurred, the raw torque (ts_tq_raw) calculation is held at 146, and the tip-in flag is set true at 148; otherwise, the raw torque is updated at 150, and the flag is cleared at 152. To allow the tip-in transient to be attenuated, this calculation is held until clutch slip is above a calibrated magnitude, or the transmission input is accelerating above a calibrated rate.

A filter constant (ts_air_fk) is calculated 154, such that it mimics the increase in engine output torque as a function of engine intake mass airflow to represent a simple dynamic engine model. The engine intake mass airflow is a function of gear and engine speed. The raw engine torque is filtered 156 by the air constant to determine filtered torque (ts_tq_flt). The filtered torque is an input into a lookup table stored in electronic memory to determine input torque (ts_tq_inp) at 158. This lookup table adds deadband and takes the absolute value of the torque. The deadband is added to the calculation to reduce sensitivity to noise and small perturbations at low torques. The absolute value is required for handling the negative torques that are present during brake regeneration.

In the transmission of FIG. 2, there is a special case for a power-on 3-2 downshift. During a 3-2 shift 160, the gear index is set to the torque ratio 162 of the desired or next gear rather than to the current torque ratio.

The clutch pressure that holds the torque capacity of clutch 28 to that required for the current input torque is calculated at 164 as a function of the input torque, and the gain and offset corresponding to clutch 28 for the current gear. The offset is the stroke pressure of the clutch 28. The gain is approximately the product of the effective frictional area of the clutch and the effective coefficient of friction of the clutch surfaces. Gain and offset are constants that are based on the geometry of each clutch.

To provide a smooth tip-in transient, the controlling clutch 28 must begin to slip easily. If the tip-in flag is true 166, clutch pressure is lowered at 168 by a calibrated amount (pr_drop_ji) based on gear.

Under coasting conditions, where the accelerator pedal is off and the foot brake pedal is on 170, a coast down shift is expected. To prepare for this event, the commanded clutch pressure is reduced at 172.

In step-ratio change transmissions, there are normally gears in which the transmission input torque is shared between two input friction elements 174. For the hybrid transmission 12 of FIGS. 1 and 2, that condition occurs in third gear. Either friction element, clutches 28 or 20, can be used to control the transients and the one with the best control gain should normally be chosen. It was discovered that, due to the inertia of the transmission rotating parts, the torque capacity of the non-controlled friction element has an effect. The non-controlled friction element 20 is set at 176 to the clutch pressure corresponding to the relevant current gear, i.e., the torque capacity of clutch 20 plus a safety margin to account for the added inertia torque during a shift with either the controlled or non-controlled element.

If the vehicle is coasting with both the accelerator pedal APP off and clutch slip less than a calibratable minimum (about 25 rpm.) 178, transmission input torque is very low, making closed loop control of the clutch difficult. Commanded clutch pressure can go below stroke pressure, a discontinuity that causes the controller to go into a limit cycle. To prevent this limit cycle, the pid flag is set to false at 180, which effectively cancels the closed loop control and holds the open loop pressure.

Whenever the pid_init flag is false, PID parameters are reinitialized at 182 to cancel the history of the closed loop controller and prepare it for the next closed loop controller call.

Figure 6:
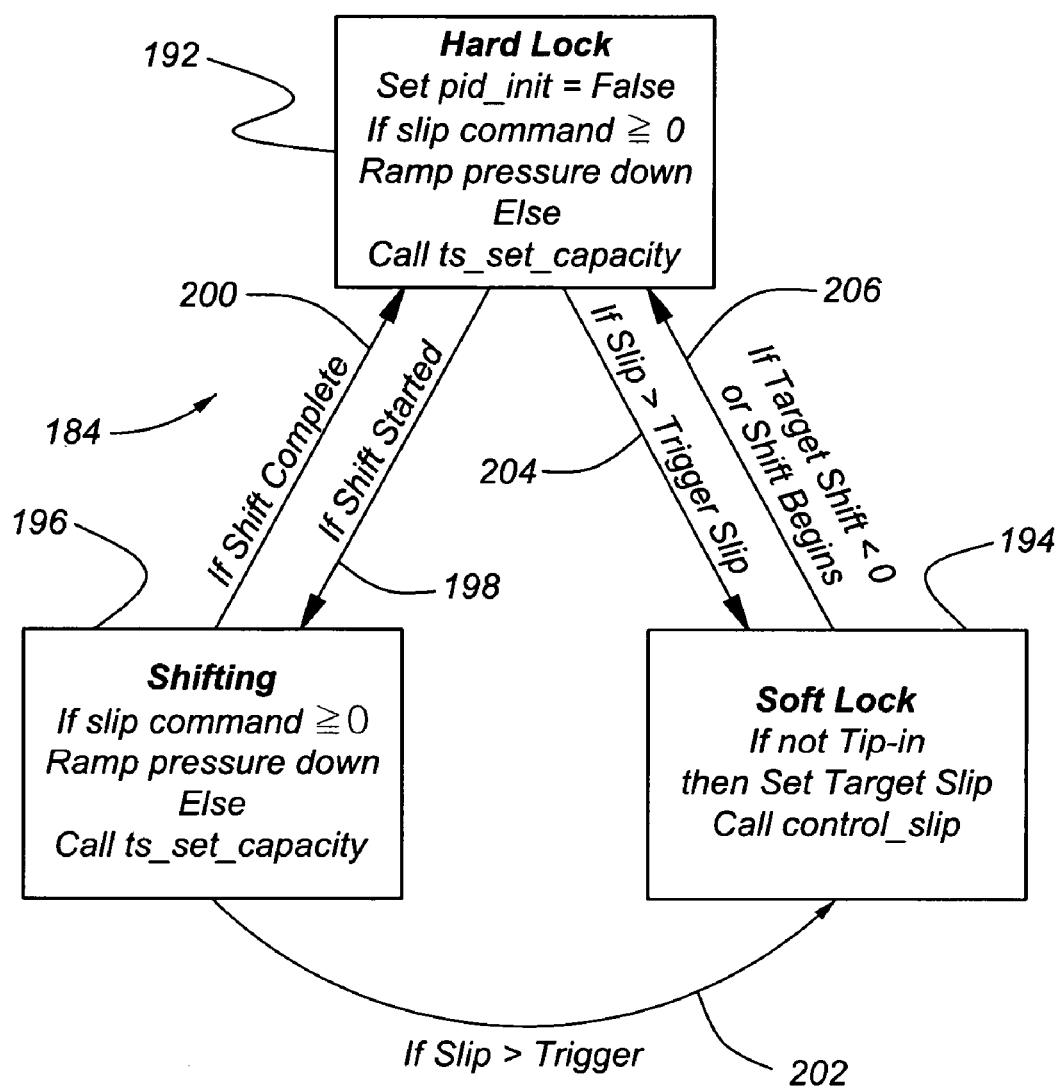
FIG. 6 is a state diagram for the controller of FIG. 5.

The torsional isolation state machine 184, shown in FIG. 6, is called at 186. Further modification can be made to the commanded clutch pressure in the state machine 184, as discussed below.

For optimal fuel economy, the line pressure is regulated to the lowest level required to hold the required torque capacity of clutch 28 on input torque. Clutch pressure produced by the control solenoids 122 varies as a function of line pressure source 126. Since the torsional isolation controller is continuous, step 182 is used to offset the command clutch pressure to adjust for the variation of line pressure. The gain is a function of the commanded line pressure, and the offset is a function of the current gear. For high commanded line pressures, the gain is 1.0 and the offset is unimportant. For low commanded line pressures, the gain goes as high as 1.7 to fully account for the reduction in solenoid output pressure based on the lower line pressure.

At step 190, the controller 100 clips the clutch pressure command at either zero or maximum.

Referring now to FIG. 6, the state machine 184 has three states: 1) hard lock 192, where the input clutch 28 is fully engaged through open loop control with pressure just above incipient slip plus a safety factor; 2) soft lock 194, where the slip of the input clutch is continuously controlled with a closed loop controller; and 3) shifting 196, where the torsional isolation controller prepares the controlled clutch for the upcoming shift event.

The home state is hard lock 192. When a shift is started 198, the shifting state is called directly from hard lock 192, or from soft lock 194 through the hard lock state. After completion of the shift 200, the state machine 184 goes back to hard lock. When clutch slip is desired, the soft lock state is called at 204 or 202 from either the hard lock 192 or shifting 196 states, provided clutch slip is greater than a trigger clutch slip value for each gear. Target slip may be 0.0 rpm. In the soft lock state, a proportional, integral, differential (PID) controller is called to manage the slip of clutch 28. If target slip is less than zero or if a shift begins, at 206 control returns to hard lock 192 from soft lock 194.

The commanded slip, which is updated every 16 Ms, is a slip speed obtained from look-up tables for each gear, the tables being stored in memory and indexed by accelerator pedal position APP and vehicle speed VS. For example, when APP is between zero and one-quarter of its maximum, and VS is between zero and one-half of its maximum, the slip command is approximately 25 rpm. At other combinations of APP and VS, slip command may be 0.0 rpm.

In the hard lock state 192, the PID controller is turned off stopping the calculation of closed loop control. In addition, if the slip command is greater than or equal to 0.0 rpm, the pressure of clutch 28 is ramped down at a predetermined ramp rate corresponding to each gear. The lowest ramp pressure is approximately 20 psi., i.e., the lowest desirable pressure to be commanded and the clutch pressure waits for slip to reach a positive value, at which point control goes to soft lock state 194. If slip command is less than 0.0 rpm, the ts_set_capacity software algorithm is called.

In the soft lock state 194, A test is made to determine whether a tip-in has occurred. A tip-in occurs for up to one-half second after APP becomes positive after the APP magnitude reaches 0.0, indicating the driver has backed off of the pedal If no tip-in has occurred, target slip is set to the value produced at the last 16 Ms interval, and the control_slip algorithm is called.

Figure 7A:
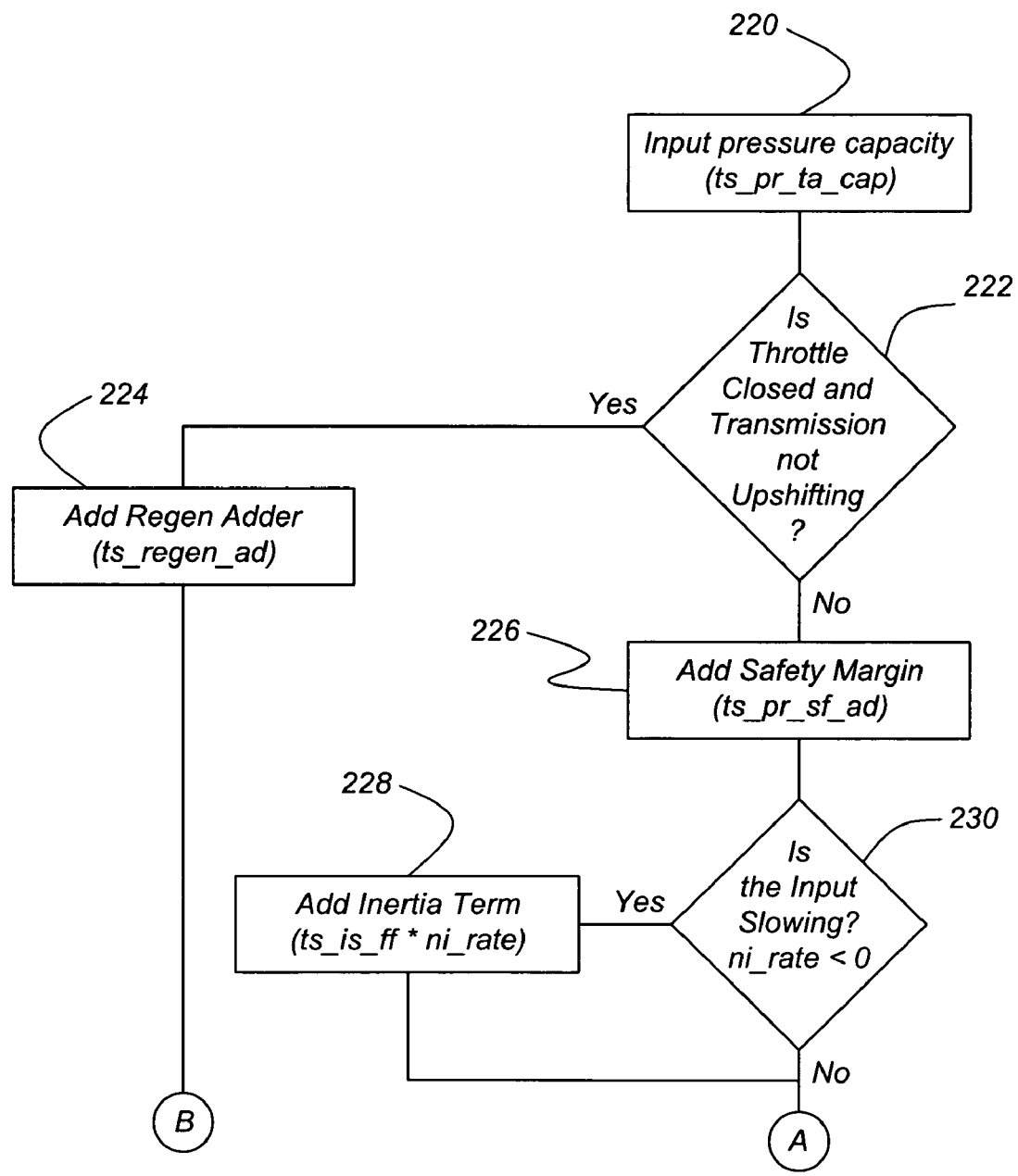
FIGS. 7A–7B are a logic flow diagram for an open loop controller for holding above incipient slip.
Figure 7B:
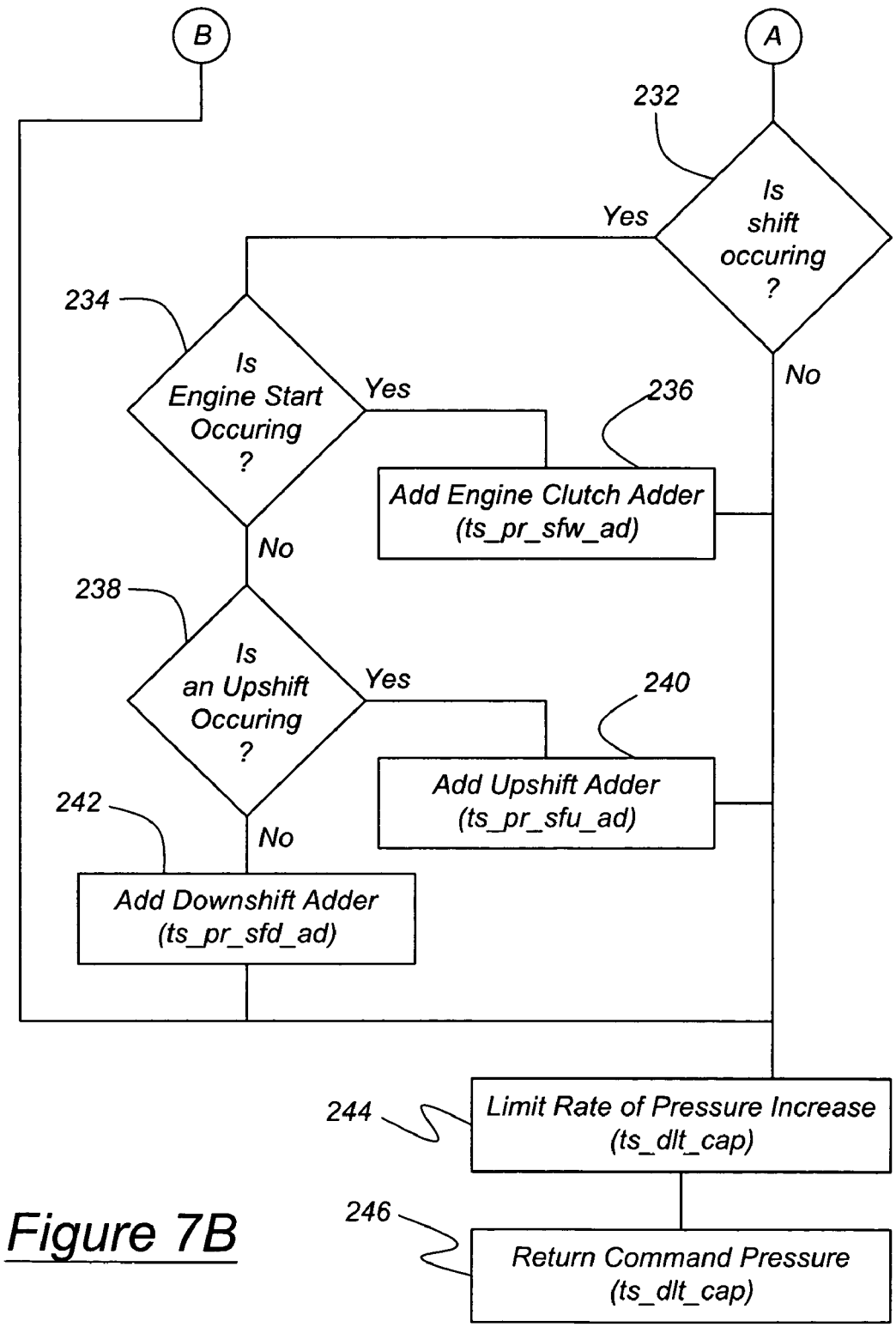

In the hard lock and shifting states 192, 196, the subroutine ts_set_capacity can be called. The purpose of ts_set_capacity is to choose the correct pressure adder to add pressure to the open loop pressure calculation based on different hard lock situations so that clutch 28 is held above its incipient slip condition. The flow chart for ts_set_capacity is illustrated in FIGS. 7A and 7B.

At step 220, the clutch pressure command produced at 188 by the controller 100 is captured. If the APP or engine throttle is closed 222, and the transmission 12 is not in the shifting state 196, the motor 14 is used to capture kinetic energy from the vehicle regen 136. To ensure that clutch 28 remains engaged, an extra amount of pressure (ts_regen_ad) is added at 224 to the clutch pressure command. A safety margin (ts_pr_sf ad) is added at 226 to the clutch pressure command to ensure clutch 28 is not slipping. Extra pressure is added at 228 to the clutch pressure command if test 230 indicates that the input 22 is decelerating 228

If a shift event is occurring 232, three special adders are used to account for the added inertia torque that passes through the clutch 28. If the engine is being started 234, add the engine clutch adder (ts_pr_sfw_ad) 236. If an up-shift is occurring 238, add the up-shift adder (ts_pr_sfu_ad) 240. Or if a downshift is occurring, add the downshift adder (ts_pr_sfd_ad) 242.

A sudden increase in pressure can create a torque transient in the driveline. Therefore, at step 244 the time rate of increase of clutch pressure is limited. The final clutch command pressure is returned 246 to controller 100.

Figure 8:
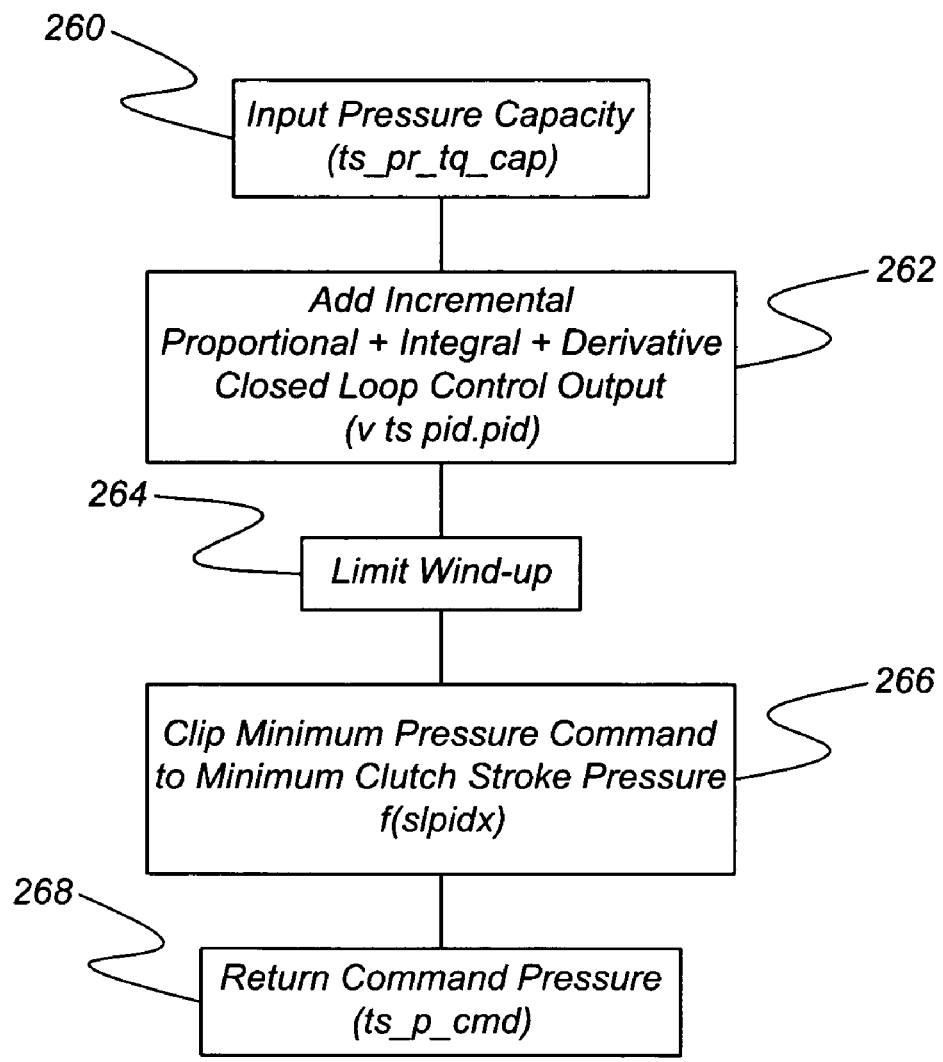
FIG. 8 is a logic flow diagram for a closed loop slip controller.

Turning now to FIG. 8, during the soft lock state 194, the subroutine control_slip is called. In control_slip, the actual clutch slip is calculated (ts_slip_abs) and compared with the desired slip (ts_cmd).

At 260, the open loop clutch capacity is set from the main loop, step 164. A PID control system 145, which regulates the command pressure to control the level of slip in the clutch 28, is called at 262. Limits are put in place at 264 to prevent integrator wind-up in the controller. The commanded clutch pressure is clipped at 266 so that it will not go below the stroke pressure of the clutch, the limit of its range of authority. The final clutch command pressure is returned 268 to controller 100.

Figure 9:
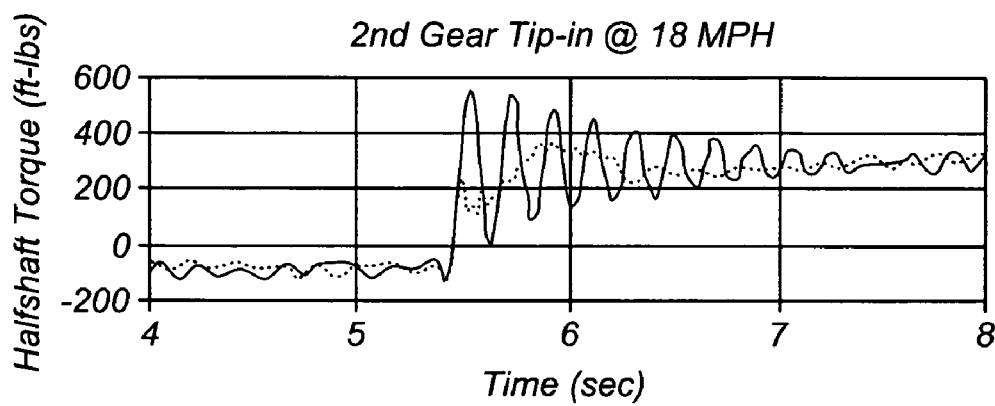
FIGS. 9, 10 and 11 are graphs of halfshaft torque, forward clutch slip, and forward clutch pressure versus time, respectively, for a fully locked transmission and a transmission controlled according to the strategy of this invention.
Figure 10:
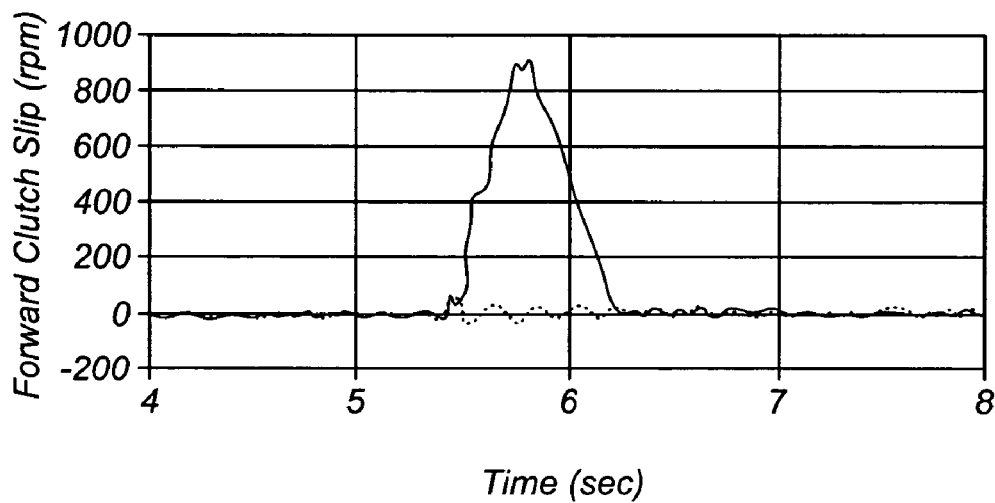
Figure 11:
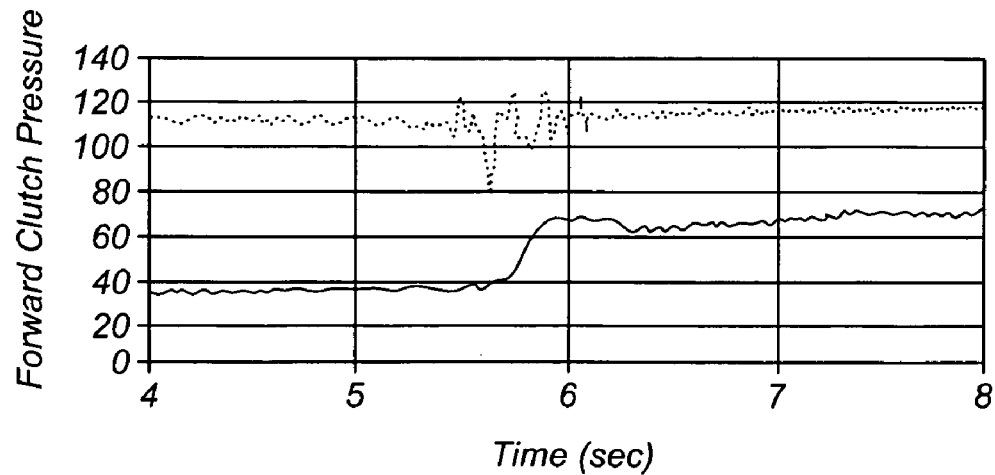

A key operation of the controller is to smoothly handle the driveline lash related difficulties resulting from a tip-in from a heavy negative torque, such as a tip-in produced from brake regeneration 136 torque, to a positive torque. In FIGS. 9–11 halfshaft torque, forward clutch slip, and forward clutch pressure for a totally locked transmission are compared to those of a transmission controlled by the strategy of this invention. Before the tip-in event, the torsional controller is in the soft lock state 194. On tip-in, the system remains in soft lock and the torque calculation is held until a preset level of slip occurs. The controller then changes to hard lock 192 and updates the torque calculation 132. The desired clutch pressure from the controller increases, but the actual commanded pressure increase is limited by the rate limiter in step 244 of the ts_set_capacity algorithm. A smooth transfer of torque to the halfshafts 56, 58 can be seen in FIG. 9.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for controlling operation of a hydraulically-actuated input clutch in an automotive vehicle driveline that includes an internal combustion engine for transmitting input torque to the clutch and having a throttle that is controlled by a displaceable accelerator pedal, and a transmission for producing multiple gear ratios between the clutch and an output, the clutch having a variable torque capacity, slip and clutch pressure, the method comprising the steps of:

determining the current magnitude of input torque transmitted to the clutch by the engine;

monitoring slip speed at the input clutch;

determining a magnitude of clutch pressure that would produce a torque capacity of the input clutch equal to the current magnitude of input torque;

monitoring the position of the accelerator pedal to determine whether a transient condition occurs;

if no transient condition occurs, pressurizing the clutch at a magnitude of pressure that produces a predetermined slip of the input clutch at the current magnitude of input torque; and if a transient condition occurs, reducing said determined magnitude of input clutch pressure to a predetermined magnitude such that slip occurs at the input clutch.

2. The method of claim 1, wherein the step of reducing the clutch pressure by a first predetermined magnitude if a transient condition occurs further comprises:

reducing input clutch pressure to a magnitude of pressure that produces incipient slip of the input clutch when input torque is applied to the input clutch.

3. The method of claim 1, wherein the step of reducing the clutch pressure if a transient condition occurs further comprises:

reducing input clutch pressure by a second predetermined magnitude that varies with the gear ratio being produced by the transmission, such that slip occurs at the input clutch.

4. The method of claim 1, wherein the vehicle includes a displaceable brake pedal, the method further comprising:

monitoring the displacement of the accelerator pedal and brake pedal; and if the brake pedal is depressed and the accelerator pedal is not depressed, reducing the clutch pressure by a third predetermined magnitude.

5. The method of claim 1, wherein the vehicle includes a displaceable brake pedal, the method further comprising:

monitoring displacement of the brake pedal; and if the brake pedal is not depressed and the accelerator pedal is not depressed, reducing input clutch pressure to produce slip at the input clutch.

6. The method of claim 1, further comprising:

if the transient condition is concluded, changing clutch pressure to a magnitude of pressure that produces a predetermined magnitude of slip of the input clutch when input torque is applied to the input clutch.

7. The method of claim 1, wherein the vehicle includes a displaceable brake pedal, further comprising:

if the brake pedal is depressed and the accelerator pedal is not depressed, the step of reducing the clutch pressure further comprises reducing the clutch pressure to a magnitude that produces input clutch torque capacity required for a coasting downshift by the transmission from the current gear ratio to a lower gear ratio.

8. The method of claim 1, wherein the vehicle includes a displaceable brake pedal, the method further comprising the steps of:

determining whether a second input clutch transmits input torque in combination with the input clutch in a gear ratio produced by the transmission; and pressurizing the second input clutch to a magnitude of pressure that produces incipient slip across the second clutch.

9. The method of claim 1, wherein the step of pressurizing the clutch at a magnitude of pressure that produces a predetermined slip of the input clutch, if no transient condition occurs, further comprises:

maintaining input clutch pressure at a minimum magnitude that is equal to or greater than a stroke pressure of the input clutch.

10. A system for controlling operation of a hydraulically-actuated input clutch in an automotive vehicle driveline, the clutch having a variable torque capacity, slip and clutch pressure, the system comprising:

an internal combustion engine transmitting input torque to the clutch and having a throttle for controlling torque produced by the engine;

a displaceable accelerator pedal for controlling the engine throttle;

a displaceable accelerator pedal;

a transmission for producing multiple gear ratios between the clutch and an output;

a controller including a closed-loop control and an open-loop control, the controller determining the current magnitude of input torque transmitted to the clutch by the engine; monitoring slip speed at the input clutch; determining a magnitude of clutch pressure that would produce a torque capacity of the input clutch equal to the current magnitude of input torque; monitoring the position of the accelerator pedal to determine whether a transient condition occurs; if no transient condition occurs, using the closed-loop control to pressurize the clutch at a magnitude of pressure that produces a predetermined slip of the input clutch at the current magnitude of input torque; and if a transient condition occurs, using the open-loop control to reduce said determined magnitude of input clutch pressure by a predetermined magnitude such that slip occurs at the input clutch.

11. The method of claim 10, wherein the controller further uses the open-loop control to reduce input clutch pressure to a magnitude of pressure that produces incipient slip of the input clutch when input torque is applied to the input clutch, if a transient condition occurs.

12. The method of claim 10, wherein the controller further uses the open-loop control to reduce input clutch pressure to a second predetermined magnitude that varies with the gear ratio being produced by the transmission, such that slip occurs at the input clutch, if a transient condition occurs.

13. The method of claim 10, wherein the controller further monitors displacement of the brake pedal, and if the brake pedal is depressed and the accelerator pedal is not depressed, uses the open-loop control to reduce the clutch pressure to a third predetermined magnitude.

14. The method of claim 10, wherein the controller further monitors displacement of the brake pedal, and, if the brake pedal is not depressed and the accelerator pedal is not depressed, uses the open-loop control to reduce input clutch pressure to produce slip at the input clutch.

15. The method of claim 10, wherein the controller further monitors displacement of the accelerator pedal to determine whether the transient condition is concluded, monitors displacement of the brake pedal, and, if the transient condition is concluded, uses the closed-loop control to change input clutch pressure to a magnitude of pressure that produces a predetermined magnitude of slip of the input clutch when input torque is applied to the input clutch.

16. The method of claim 10, wherein the controller further monitors displacement of the brake pedal, and, if the brake pedal is depressed and the accelerator pedal is not depressed, reduces the clutch pressure further comprises reducing the clutch pressure to a magnitude that produces input clutch torque capacity required for a coasting downshift by the transmission from the current gear ratio to a lower gear ratio.

17. The method of claim 10, wherein:
the system further comprises a second input clutch; and
the controller further monitors displacement of the brake pedal, and, determines whether the second input clutch transmits input torque in combination with the input clutch in a gear ratio produced by the transmission; and, pressurizes the second input clutch to a magnitude of pressure that produces incipient slip across the second clutch.

18. The method of claim 10, wherein the controller further uses the closed-loop control to maintain input clutch pressure at a minimum magnitude that is equal to or greater than a stroke pressure of the input clutch, if no transient condition occurs.

* * * * *